US006847453B2

(12) United States Patent
Bush

(10) Patent No.: US 6,847,453 B2
(45) Date of Patent: Jan. 25, 2005

(54) ALL FIBER AUTOCORRELATOR

(75) Inventor: Ira Jeffery Bush, Los Angeles, CA (US)

(73) Assignee: OptiPhase, Inc., Van Nuys, CA (US)

( * ) Notice: Subject to any disclaimer, the term of this patent is extended or adjusted under 35 U.S.C. 154(b) by 75 days.

(21) Appl. No.: 09/992,941

(22) Filed: Nov. 5, 2001

(65) Prior Publication Data
US 2003/0086093 A1 May 8, 2003

(51) Int. Cl.$^7$ .............................................. G01B 9/02
(52) U.S. Cl. ...................................................... 356/479
(58) Field of Search ................................ 356/479, 497; 250/227.19, 227.27; 385/12

(56) References Cited

U.S. PATENT DOCUMENTS

| | | | |
|---|---|---|---|
| 5,206,924 A | * | 4/1993 | Kersey ......................... 356/477 |
| 5,633,712 A | * | 5/1997 | Venkatesh et al. ........... 356/479 |
| 5,867,268 A | * | 2/1999 | Gelikonov et al. .......... 356/477 |
| 6,014,215 A | * | 1/2000 | Kempen et al. ............. 356/479 |

OTHER PUBLICATIONS

Bush, Jeff, Davis, Pepe, Marcus, Michael A., "All–Fiber Optic Coherence Domain Interferometric Techniques," Mar. 2001, pp. 1–10,SPIE Photonics East 2000, Boston, Ma., 4204A–08.

* cited by examiner

Primary Examiner—Samuel A. Turner
(74) Attorney, Agent, or Firm—Michael Blaine Brooks, PC; Michael Blaine Brooks

(57) ABSTRACT

An autocorrelator apparatus and method for economically measuring physical properties of an object where the measurement path is at least semi-translucent to light, such as thicknesses in multilayered optical structures, group index of refraction, and distance to a surface. The apparatus includes a non-coherent light fiber interferometer and an optional coherent light fiber interferometer in association so as to share PZT fiber modulators. Thickness and boundary extent measurements can be made, for example, of solids, liquids, liquids moving along a horizontal plane, or liquids flowing down a plane.

18 Claims, 4 Drawing Sheets

ALL FIBER AUTOCORRELATOR

FIELD OF INVENTION

The invention relates generally to autocorrelators constructed from optical fiber instead of bulk optics useful for measuring reflection areas in materials and physical properties thereof that are at least semi-transparent to light.

BACKGROUND OF THE INVENTION

In web and coating manufacturing operations, expensive bulk optic interferometric apparatuses are used for accurate, on-line measurements of web and coating layer thickness. An apparatus, such as shown in U.S. Pat. No. 5,633,712, by Venkatesh, et al., U.S. Pat. No. 5,659,392, by Marcus, et al. which issued Aug. 19, 1997 and the associated method taught in U.S. Pat. No. 5,596,409 by Marcus, et al. which issued Jan. 21, 1997 have a high degree of lateral resolution, are light weight, compact, easy to set up, and are robust in high and low temperature environments, in the presence of solvents, high air flow, and various levels of relative humidity. Such apparatuses are self-calibrating or able to remain in calibration for extended periods of time so that the apparatus can be installed on a production machine without the need for re-calibration. Unfortunately, the expensive bulk optics and mechanics required in such devices reduce their usefulness except in high value production applications. In addition, the mechanical nature of the scanning optics of such devices reduce the possible scan rate and service life.

Therefore, there has been a need for an economical, long lifetime measuring device, which can produce accurate measurements at high scan rates that require little periodic maintenance and can be packaged with minimal size and mass.

SUMMARY OF THE INVENTION

In the present invention, the disadvantages of the prior art interferometric devices are overcome by eliminating bulk optic and mechanical components, and providing an all fiber device. The mechanical components and open optics are eliminated and instead, scanning is accomplished by means of piezo electric fiber stretchers usually configured in tandem to provide a rapid, accurate measurement with a relatively large dynamic range. Replaceable sensing probes may be any length and do not require length matching to other components of the measuring instrument.

In the present invention, broadband light (of a first wavelength) is guided by a probe fiber of arbitrary length to the sample material. Multiple reflections of the broadband light from the sample are oppositely guided back through the probe fiber, and subsequently guided to an all-fiber, optical path matched autocorrelator assembly where this light is split into two beams which each pass through fiber stretchers, which are driven in opposite directions. Both beams are reflected back upon themselves so as to double pass their respective fiber stretchers to be recombined with the original splitter. The recombined signal is guided to a photodetection device creating a first electronic signal representative of the scanned reflections from the sample material.

The present invention also allows for a wavelength stable coherent optical source of a second wavelength different than that of the broadband source to be co-injected to the autocorrelator assembly with the broadband light. This second wavelength co-propagates with the first wavelength through the autocorrelator taking the same paths of the first wavelength and is also recombined with the original splitter causing an interferometric fringe rate proportional to the optical path variations caused by the fiber stretchers. This second wavelength is then guided to a separate photodetection device causing a second electronic signal which represents a highly accurate measure of the autocorrelator scan. This second electronic signal may be used to assist in the interpretations of the first electronic signal such that a highly accurate displacement measure of the multiple reflections from the sample material may be made. These interpretations in turn may be used to accurately define physical properties of the sample material.

Therefore, it is an object of the present invention to provide an improved white light interferometric reflective measuring device at a fraction of the cost of similar measuring devices available in the prior art.

Another object is to provide a white light interferometric reflective measuring device that implements its scanning mechanism by means of fiber stretching.

Another object is to provide a white light interferometric reflective measuring device that incorporates an optical path matched autocorrelator section which is independent of the probe fiber, hence removing the requirement of path matching for the probe fiber.

Another object is to provide a white light interferometric reflective measuring device with high resolution and fast scan rates.

Another object is to provide a white light interferometric reflective measuring device that provides for a first broad band wavelength to probe the sample material and a second coherent wavelength to measure the scan distance variations of the autocorrelator.

Another object is to provide a white light interferometric reflective measuring device that utilizes low cost single mode fiber and associated low-cost single mode fiber components and implements orthoconjugate mirrors (known as Faraday rotator mirrors (FRM)) in the autocorrelator section which assures both high interferometric visibility and minimal birefringence modulation of the broadband light. This in turn provides the highest possible resolution capability of the instrument.

These and other objects and advantages of the present invention will become apparent to those skilled in the art after considering the following detailed specification, together with the accompanying drawings wherein:

BRIEF DESCRIPTION OF THE DRAWINGS

FIG. 3A is a graph of output level vs displacement for the autocorrelator of FIG. 3 when its probe is pointed at a rear surface mirror.

DETAILED DESCRIPTION OF THE PREFERRED EMBODIMENTS

Figure 1:
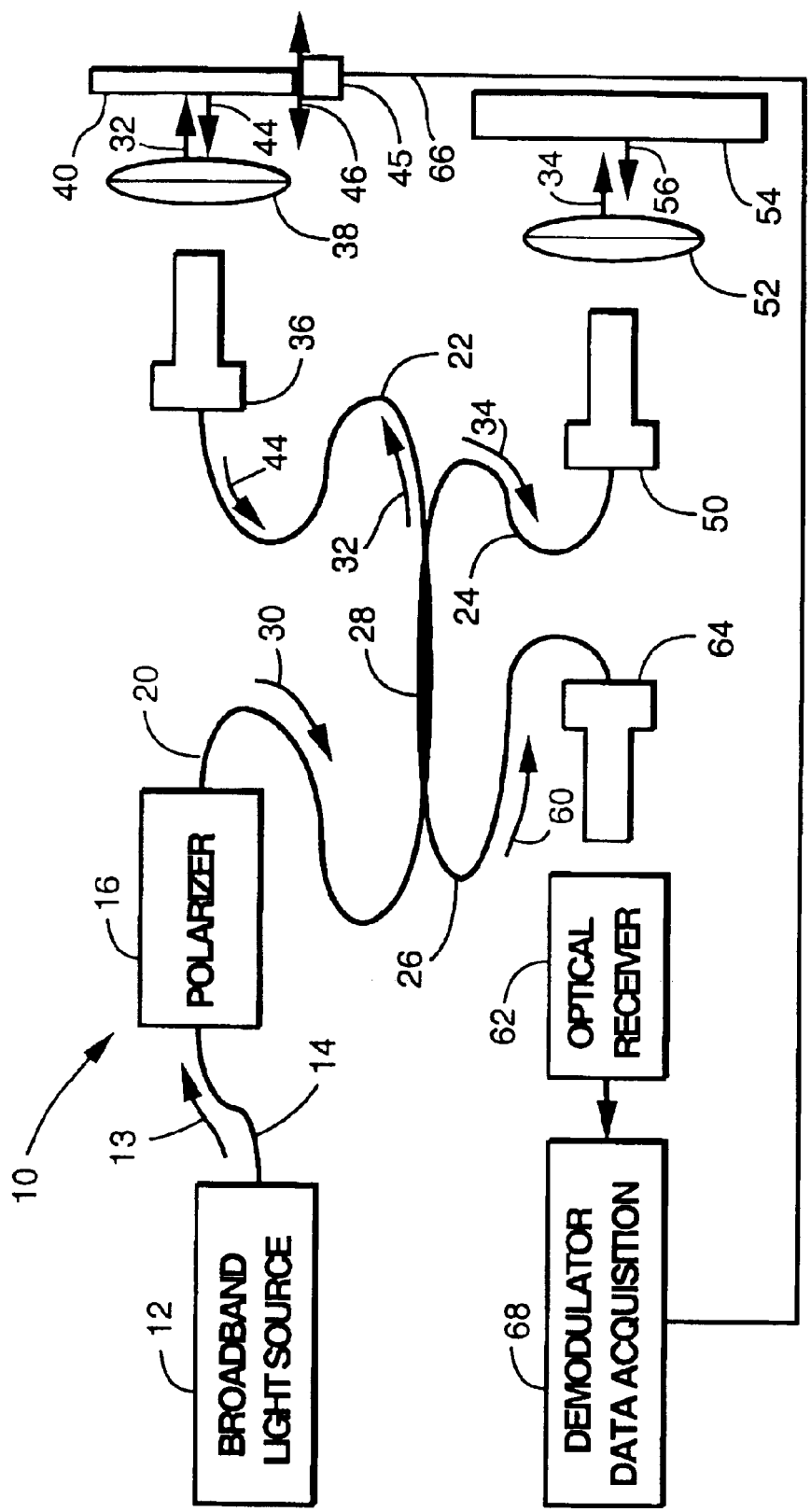
FIG. 1 is a schematic diagram of a partial fiber configured interferometric reflective measuring device (Michelson white light interferometer) constructed in accordance with the prior art and having a fiber probe.

Referring to the drawings more particularly by reference numbers, number 10 in FIG. 1 refers to a prior art Michelson scanning interferometer in which a broadband light source 12 provides white light 13 through a fiber 14 to a polarizer 16. The polarizer 16 and the polarization maintaining fibers 20, 22, 24, and 26 downstream therefrom as well as a polarization maintaining fiber coupler 28 are included to eliminate polarization fading.

The polarized white light 30 passes through the fiber 20 and is split into two light beams 32 and 34 by the polarization maintaining fiber coupler 28. The beam 32 is projected out of a non-reflective fiber termination 36, through a focusing lens 38 and onto a mirror device 40. The mirror device 40 may be a corner cube or retro-reflector to assure that the reflected reference beam 44 returns to the termination 36 without much attenuation. The referenced beam 44 is formed by translating the device 40 typically by means of either a motorized linear slide, rocker assembly or a beam deformer 45, whose motion is shown symbolically by the arrow 46. Such techniques have proven to be effective in providing appropriate scan ranges, but have a number of undesirable features when being considered for instrument production. These include: high cost of the launch and collection optics, and specialized motor controllers; low speed scan rates because inertia limits scan rate, and rocker assemblies limit range through angle changes; the requirement for periodic maintenance such as optical alignment and cleaning; the limited lifetimes inherent in mechanical systems with moving parts; and package limitations because compact packages are delicate, so size and mass must be increased for robustness.

The sensing beam 34 in the sensing leg of fiber 24 is projected out of a fiber termination 50, through a focusing lens 52 and onto a sample 54 whose spacing of reflective interfaces are to be determined. The fiber termination 50 may be a partial reflective termination to enable a reference distance to the sample by producing a reference reflection or the sensing leg fiber termination 50 may be non-reflective and a reference reflection be incorporated into the sample 54.

The beams 44 and 56 are combined in the polarization maintaining fiber coupler 28 as an optical signal 60 whose intensity varies with time in reference to the motion of the mirror device 40 where there will be zones of incoherent intensity summation and zones of coherent recombination (of the two beams 44 and 56). The beam 60 passes through fiber 26 to be projected onto an optical receiver 62 by a non-reflective fiber termination 64. The optical receiver 62 converts the optical intensity levels into electrical signals, which are digitized for subsequent signal processing. Also digitized is the electrical monitor or pick-off signal along line 66 from the translating device 45 by the data acquisition demodulator 68.

Figure 2:
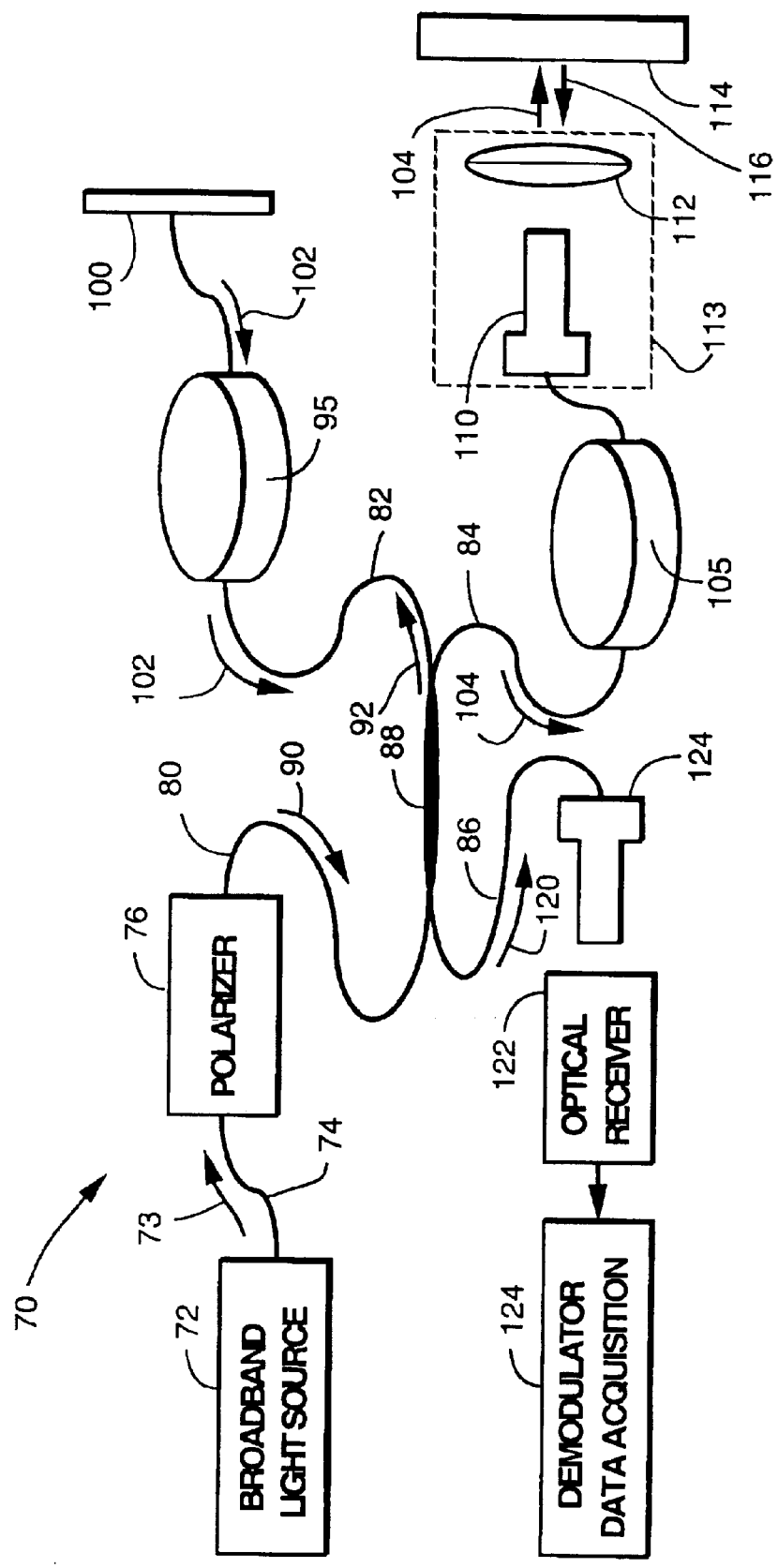
FIG. 2 is a schematic diagram of a modified version of the device of FIG. 1 with an all fiber scanning assembly.

The concept of an all-fiber Michelson white light interferometer 70, as shown in FIG. 2, is highly appealing in that the light is self contained and eliminates the packaging complexities associated with integration of bulk optics with fiber waveguides. A polarization maintaining fiber arrangement is shown. The scanner apparatus 70 includes a broadband light source 72 that provides white light 73 through a fiber 74 to a polarizer 76. The polarizer 76 and the polarization maintaining fibers 80, 82, 84, and 86 downstream therefrom as well as a polarization maintaining 50/50 fiber coupler 88 are included to eliminate polarization fading.

The polarized white light 90 passes through the fiber 80 and is split into two light beams 92 and 104 by the fiber coupler 88. The beam 92 is passed through a piezoelectric fiber stretcher 95 and is reversed in direction by mirror 100 as reference beam 102.

In piezoelectric fiber stretchers 95, 105, typically a length of fiber is wound around the circumference of a ceramic piezo cylinder element with a sufficient tension that assures that the fiber never goes limp. Using the white light interferometer configuration 70, with available fibers of reasonable length and appropriate piezo ceramic material for the modulators, 10 mm of scan range can be obtained for low frequency scan rates and at 1mm scans, an order of magnitude faster scan rate can be produced. It is typical that when using 2.3 inch diameter cylinders, each with 40 meters of fiber applied that 10 mm scans at 50 Hz rates and 1 mm scans at 500 Hz may be achieved.

The sensing beam 104 in the sensing leg of fiber 84 is passed through a piezoelectric fiber stretcher 105, driven opposite to the stretcher 95, and is projected out of a fiber termination 110, through a optional focusing lens 112 which forms the probe 113, and onto a sample 114 whose spacing of reflective interfaces are to be determined. Like before, the fiber termination 110 may be a partial reflective termination to enable a reference distance to the sample 114 by producing a reference reflection in the return reference beam 116 or the sensing leg fiber termination 110 may be non-reflective and a reference reflection be incorporated into the sample 114.

The beams 102 and 116 are combined in the fiber coupler 88 as an interference beam 120 whose intensity varies with time in reference to the stretching of the fibers 82 and 84. To assure that interference between the two beams 102 and 116 occurs, the pathlengths out and back to the fiber coupler 88 must be very close, since any mismatch reduces the dynamic measuring range of the instrument 70.

The beam 120 passes through fiber 86 to be projected onto an optical receiver 122 by a non-reflective fiber termination 124. The optical receiver 122 converts the intensity changes in the beam 120 into electrical signals, which are demodulated in a demodulator 124 in accordance to the stretching by the piezoelectric fiber stretchers 95 and 105.

The PM fiber arrangement in FIG. 2 is the design of choice. The use of lower cost single mode fiber scanners with PZT modulators produces birefringence modulation caused by the modulation process, which broadens the coherence which reduces measurement resolution and also causes polarization fading although such are available for very low cost applications.

Figure 3:
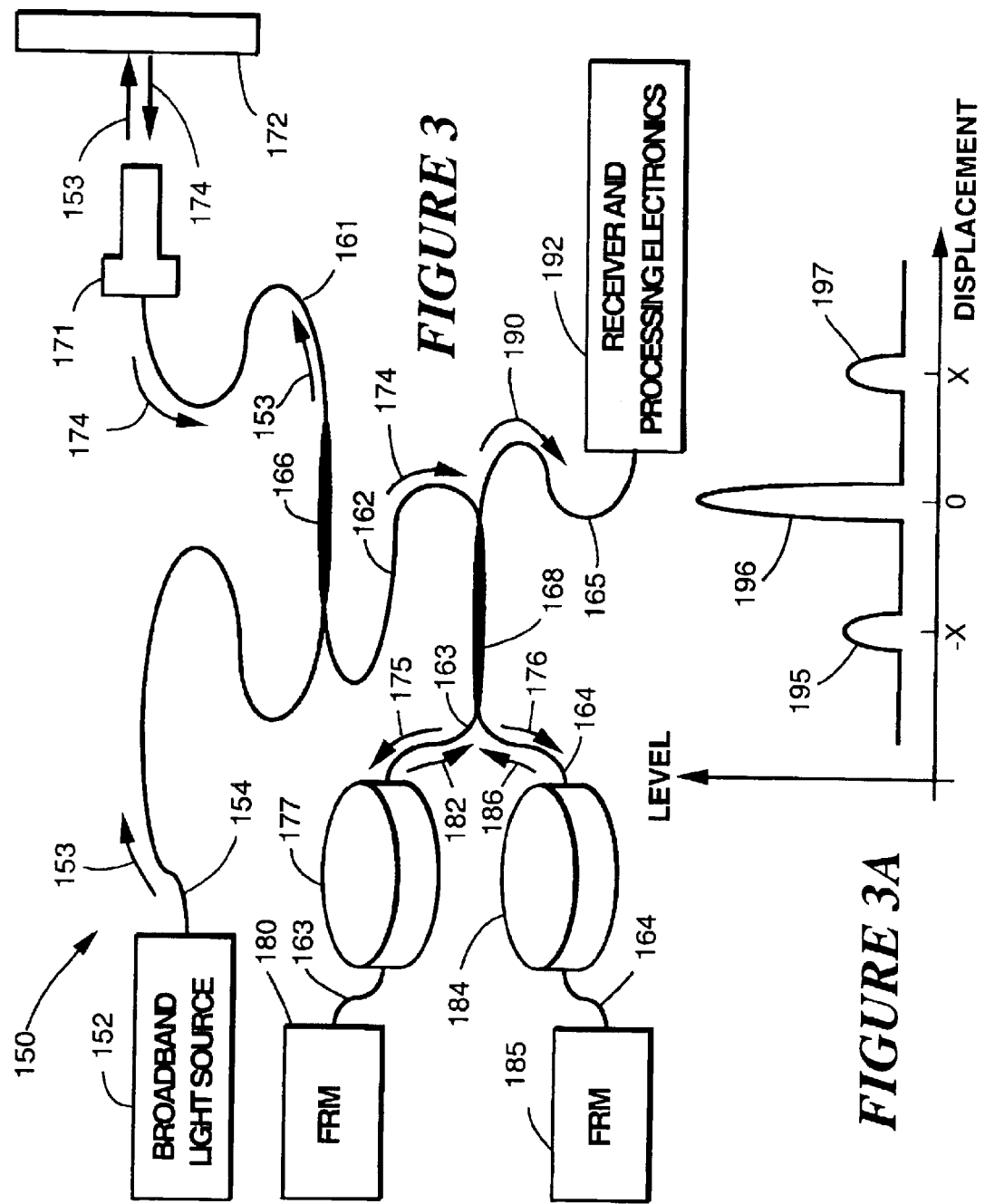
FIG. 3 is a schematic diagram of a all fiber autocorrelator constructed in accordance with the present invention.

A variation of the All-Fiber Michelson white light interferometer 70 is realized when the probe 113 is located external to the interferometer 70. In this case, the light returning from a sample is sent to a scanning interferometer and then processed. This all-fiber autocorrelator 150 as shown in FIG. 3, has the advantage of using a probe of arbitrary length without having to match the length of a probe fiber to the length of a reference fiber. Another advantage involves the use of lower cost single mode fiber to replace the polarization maintaining fiber where no birefringence modulation degradation is experienced when Faraday rotator mirrors are used.

The all-fiber autocorrelator 150 is shown in FIG. 3 in its most generic form. Here the same type of fiber modulator scanning mechanism as in instrument 70 is used. A disadvantage to this approach when compared to the Michelson approach is that it has a larger optical loss resulting from the extra coupler. This coupler could however be replaced (at an additional expense) with a circulator to improve the throughput power such that is roughly equivalent to that of the Michelson approach. Use of the circulator also provides immunity of the broadband source from back reflected light from the sample.

Unlike before, a single mode fiber arrangement is shown. The autocorrelator 150 includes a broadband light source 152 that provides white light 153 through a single mode fiber 154. The single mode fiber 154 and the single mode fibers 161, 162, 163, 164 and 165 downstream therefrom as well as 50/50 single mode fiber couplers 166 and 168 form the primary light paths for the autocorrelator 150.

The white light 153 passes through the fiber 154, fiber coupler (or three port circulator) 166, fiber 161 and out of a probe 171 for reflection off the sample 172 under test. The reflected beam 174 is re-acquired by the probe 171 is conducted by the fiber coupler 166 and fiber 162 to the second 50/50 single mode coupler 168 where it is split into two light beams 175 and 176. The probe 171 could include a separate optical fiber for re-acquiring the reflected beam 174, in which case, fiber coupler 166 can be eliminated. The beam 175 is passed through a single mode fiber wound piezoelectric fiber stretcher 177 and is reversed in direction by Faraday rotator mirror 180 providing an orthoconjugate reflection causing a 908 polarization rotation as first reference/signal beam 182. The beam 176 is passed through a second piezoelectric fiber stretcher 184 driven opposite from stretcher 177 and is reversed in direction by Faraday rotator mirror 185 where its polarization is also rotated by 90° as second reference/signal beam 186. The second fiber stretcher does not need to be present when a reduced measurement range is all that is required so long as the light beam 176 travels a similar light path distance to that of light beam 175. Passage through the stretchers 177 and 184 can cause birefringence variations so shifting the return beams state of polarization by 90° causes any birefringence variations of the light going through in one direction to be corrected during the reverse passage. The piezoelectric fiber stretchers 177 and 184 are constructed as described for stretchers 95 and 105, with the fibers 163 and 164 forming the light guides thereof being optical path matched.

The first and second reference/signal beams 182 and 186 are combined into an interference beam 190 by the single mode coupler 168 and conducted by single mode fiber 165 to receiver and processing electronics 192. The response of the autocorrelator 150 shown as a rectified envelope of the inteferogram from a single autocorrelator scan of a rear surface mirror having a partial reflecting front surface separated by a distance X to the rear reflector as the sample is shown in FIG. 3A with the probe through a piezoelectric fiber stretcher 278 and is reversed in direction by Faraday rotator mirror 280 where its state of polarization is rotated 90° as first reference/signal beam 282. The beam 277 is passed through a second piezolectric fiber stretcher 284 driven opposite from stretcher 278 and is reversed in direction by Faraday rotator mirror 285 where its state of polarization is rotated 90° as second reference/signal beam 286. The piezoelectric fiber stretchers 278 and 284 are constructed as described for stretchers 95 and 105, with the fibers 263 and 264 forming the light guides therof being optical path matched.

Figure 4:
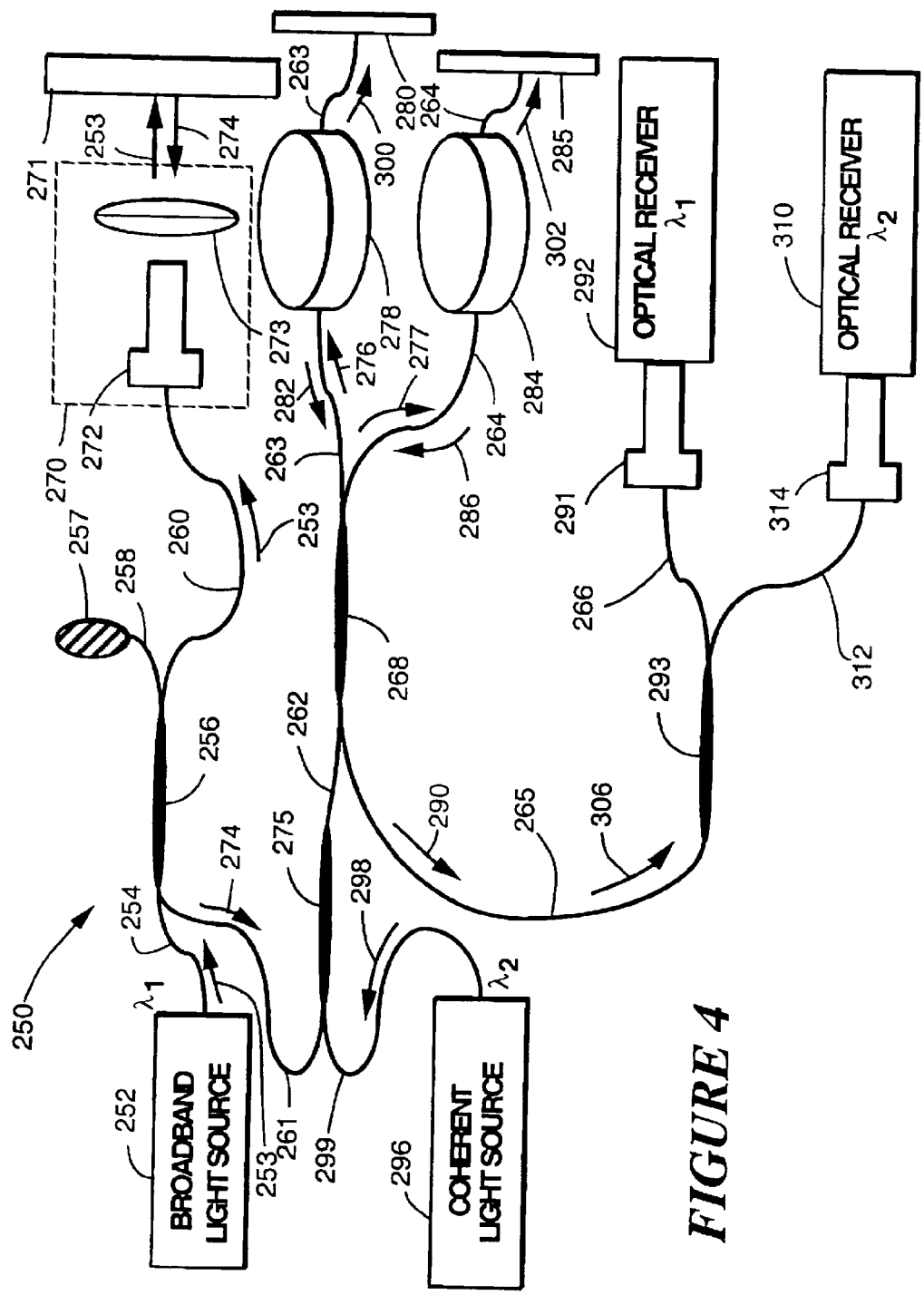
FIG. 4 is a schematic diagram of an enhanced version of the autocorrelator of FIG. 3 including a reference laser.

The autocorrelator 250 shown in FIG. 4 uses an additional coherent optical source which co-propagates with the broadband light inside the scanning interferometer. Wavelength division multiplexer's (WDM) or other appropriate combining/splitting and filter elements are used to inject and separate out the returns from the broadband and coherent sources. The detected fringe crossings from the coherent source are used to determine the exact displacement of the scan at all points in the sweep.

The modified autocorrelator 250 is shown in FIG. 4 is essentially identical to the autocorrelator 150 except for modifications to allow injection and separation of returns from a coherent source so that detected fringe crossings from the coherent source can be used to determine the exact displacement of the scan at all points in the sweep. The modified autocorrelator 250 includes a broadband light source 252 that provides white light 253 at a center frequency $\lambda_1$ through a fiber 254 to a 50/50 coupler 256, or in applications that require low light loss, a three port circulator. The coupler 256 is shown with a termination 257 on its unused leg 258. The coupler 256 and the single mode fibers 260, 261, 262, 263, 264, 265, 312, and 266 downstream therefrom as well as 50/50 fiber coupler 268 form the main sensing light path of the autocorrelator 250.

The white light 253 passes through the fiber 260 and out of a probe 270 for reflection off the sample 271 under test. Like before, the probe 270 includes a fiber termination 272 and an optional focusing lens 273. The reflected beam 274 is re-acquired by the probe 270, and is conducted by the coupler 256, fiber 261, and a wavelength division multiplexer 275 (or coupler used to combine the two beams) to the second 50/50 coupler 268 where it is split into two light beams 276 and 277. The beam 276 is passed through a piezoelectric fiber stretcher 278 and is reversed in direction by Faraday rotator mirror 280 where its state of polarization is rotated 90° as first reference/signal beam 282. The beam 277 is passed through a second piezoelectric fiber stretcher 284 driven opposite from stretcher 278 and is reversed in direction by Faraday rotator mirror 285 where its state of polarization is rotated 90° as second reference/signal beam 286. The piezo-electric fiber stretchers 278 and 284 are constructed as described for stretchers 95 and 105, with the fibers 263 and 264 forming the light guides thereof being optical path matched.

The first and second reference/signal beams 282 and 286 are combined into an interference beam 290 on fiber 265 by the coupler 268 and directed through a fiber termination 291 to an optical receiver 292 by a WDM 293 or other appropriate splitter and filter.

The autocorrelator 250 shown in FIG. 4 uses a coherent light source 296 and injects a coherent beam 298 into fiber 299 at a frequency $\lambda_2$, that is not common with any of the frequencies centered at $\lambda_1$, by means of the WDM 275 positioned between the couplers 256 and 268. It is important that $\lambda_2$ be selected such that it can propagate single mode through the same fiber and couplers used for $\lambda_1$ and also it be close enough in wavelength to $\lambda_1$ (25% is sufficient) so that the couplers and Faraday rotator mirrors (which are typically adjusted to $\lambda_1$) are able to (but with small errors) function correctly for this second wavelength. For example, if standard telecommunications single mode fiber is used, selections of $\lambda_1$ and $\lambda_2$ of 1300 nm and 1550 nm satisfies the criteria. Commercial devices (wide band or dual window couplers, single mode fiber, circulators, Faraday rotator mirrors, and WDM's) are abundant at these two wavelengths. The coherent beam 298 co-propagates with the broadband light inside the scanning interferometer 250. The coherent beam 298 is split by the coupler 268 into coherent beams 300 and 302. The coherent beams 300 and 302 are passed through the stretchers 278 and 284, reflected off the Faraday rotator mirrors 280 and 285, and passed again though the stretchers 278 and 284 for combination on the coupler 268 into coherent fiber modulator sensing beam 306. The beam 306 is conducted along fiber 265 and is separated by the WDM 293 onto a second optical receiver 310 by means of fiber 312 and termination 314. WDM's or other appropriate splitter/filters are used to inject and separate out the returns from the broadband and coherent sources. The detected fringe variations from the coherent light source 296 are used to determine the exact displacement of the scan at all points in the sweep.

Thus, there has been shown novel all-fiber autocorrelators which fulfill all of the objects and advantages sought therefor. Many changes, alterations, modifications and other uses and applications of the subject invention will become apparent to those skilled in the art after considering the specification together with the accompanying drawings. All such changes, alterations and modifications which do not depart from the spirit and scope of the invention are deemed to be covered by the invention which is limited only by the claims that follow.

What is claimed is:

1. An autocorrelator apparatus comprising:

a broadband light source;

a first single mode optical fiber adapted to optically connect the broadband light source to a multi-port passive device;

a second single mode optical fiber adapted to optically connect the multi-port passive device to a fiber light probe wherein the fiber light probe is adapted to emit a first broadband light beam and is adapted to receive a second broadband light beam;

a third single mode optical fiber adapted to optically connect the multi-port passive device to a first single mode fiber coupler;

a fourth single mode optical fiber having a path length, the fourth single mode optical fiber adapted to optically connect the first single mode fiber coupler to a first Faraday rotator mirror wherein the fourth single mode optical fiber is wound onto a first piezoelectric fiber stretcher for varying the optical path length of the fourth single mode optical fiber;

a fifth single mode optical fiber having a path length substantially equal to the path length of the fourth single mode optical fiber, the fifth single mode optical fiber adapted to optically connect the first single mode fiber coupler to a second Faraday rotator mirror; and a sixth single mode optical fiber adapted to optically connect the first single mode fiber coupler to a receiver having processing electronics wherein the second broadband light beam received by said fiber light probe and a signal representative of the variation in broadband light path length of said fourth optical fiber as interfered with broadband light from the fifth optical fiber are processed to produce therefrom indications of a displacement of reflections of the first broadband light beam emitted from said fiber light probe.

2. An autocorrelator apparatus of claim 1 wherein the multi-port passive device is a second single mode fiber coupler.

3. An autocorrelator apparatus of claim 1 wherein the multi-port passive device is a three-port circulator.

4. An autocorrelator apparatus of claim 1 wherein the fifth single mode optical fiber is wound onto a second piezoelectric fiber stretcher for varying the optical path length of the fifth single mode optical fiber.

5. An autocorrelator apparatus of claim 1 wherein the second broadband light beam is comprised of a reflection of the first broadband light beam.

6. An autocorrelator apparatus of claim 1 wherein the second broadband light beam is comprised of a reflection of the first broadband light beam reflected from a sample under test.

7. An autocorrelator apparatus comprising:

a broadband light source;

a first single mode optical fiber adapted to optically connect the broadband light source to a first fiber light probe wherein the first fiber light probe is adapted to emit a first broadband light beam;

a second single mode optical fiber adapted to optically connect the first fiber light probe to a single mode fiber coupler wherein the second single mode optical fiber is adapted to receive a second broadband light beam at the first fiber light probe;

a third single mode optical fiber having a path length, the third single mode optical fiber adapted to optically connect the single mode fiber coupler to a first Faraday rotator mirror wherein the third single mode optical fiber is wound onto a first piezoelectric fiber stretcher for varying the optical path length of the third single mode optical fiber;

a fourth single mode optical fiber having a path length substantially equal to the path length of the third single mode optical fiber, the fourth single mode optical fiber adapted to optically connect the single mode fiber coupler to a second Faraday rotator mirror; and a fifth single mode optical fiber adapted to optically connect the single mode fiber coupler to a receiver having processing electronics wherein the second broadband light received by the second single mode optical fiber at the first fiber light probe and a signal representative of the variation in broadband light path length of said third optical fiber as interfered with broadband light from the fourth optical fiber are processed to produce therefrom indications of a displacement of reflections of the first broadband light beam emitted from said first fiber light probe.

8. An autocorrelator apparatus of claim 7 wherein the fourth single mode optical fiber is wound onto a second piezoelectric fiber stretcher for varying the optical path length of the fourth single mode optical fiber.

9. An autocorrelator apparatus of claim 7 wherein the second broadband light beam is comprised of a reflection of the first broadband light beam.

10. An autocorrelator apparatus of claim 7 wherein the second broadband light beam is comprised of a reflection of the first broadband light beam reflected from a sample under test.

11. An autocorrelator apparatus comprising:

a broadband light source adapted to produce broadband light having a center frequency operating at a first wavelength;

a first single mode optical fiber adapted to optically connect the broadband light source to a multi-port passive device;

a second single mode optical fiber adapted to optically connect the multi-port passive device to a fiber light probe wherein the fiber light probe is adapted to emit a first broadband light beam and the fiber light probe is adapted to receive a second broadband light beam;

a third single mode optical fiber adapted to optically connect the multi-port passive device to a combining coupler;

a coherent light source adapted to produce coherent light operating at a second wavelength;

a fourth single mode optical fiber adapted to optically connect the coherent light source to the combining coupler;

a fifth single mode optical fiber adapted to optically connect the combining coupler to a first single mode fiber coupler;

a sixth single mode optical fiber having a path length, the sixth single mode optical fiber adapted to optically connect the first single mode fiber coupler to a first Faraday rotator mirror wherein the sixth single mode optical fiber is wound onto a first piezoelectric fiber stretcher for varying the optical path length of the sixth single mode optical fiber and having a first sweep;

a seventh single mode optical fiber, having a path length substantially equal to the path length of the sixth single mode optical fiber, the seventh single mode optical fiber adapted to optically connect the first single mode fiber coupler to a second Faraday rotator mirror wherein the seventh single mode optical fiber is wound onto a second piezoelectric fiber stretcher for varying the optical path length of the seventh single mode optical fiber and having a second sweep, and wherein the second piezoelectric fiber stretcher is driven opposite from the first piezoelectric fiber stretcher;

an eighth single mode optical fiber adapted to optically connect the first single mode fiber coupler to a splitter and filter assembly;

a ninth single mode optical fiber adapted to optically connect the splitter and filter assembly to a first optical receiver adapted to receive light from the second broadband light beam at the first wavelength received via said fiber light probe having optical interference related to a combination of the first sweep and the second sweep; and a tenth single mode optical fiber adapted to optically connect the splitter and filter assembly to a second optical receiver wherein the second optical receiver is adapted to detect fringe variations of the coherent light source at the second wavelength to determine the displacement of a combined scan resulting from a combination of the first sweep and the second sweep.

12. An autocorrelator apparatus of claim 11 wherein the multi-port passive device is a second single mode fiber coupler.

13. An autocorrelator apparatus of claim 11 wherein the multi-port passive device is a three-port circulator.

14. An autocorrelator apparatus of claim 11 wherein the combining coupler is a wavelength division multiplexer.

15. An autocorrelator apparatus of claim 11 wherein the splitter and filter assembly is a wavelength division multiplexer.

16. An autocorrelator apparatus of claim 11 wherein the second broadband light beam is comprised of a reflection of the first broadband light beam.

17. An autocorrelator apparatus of claim 11 wherein the second broadband light beam is comprised of a reflection of the first broadband light beam reflected from a sample under test.

18. An autocorrelator apparatus of claim 11 wherein the wavelength of the coherent light source is within 25% of the center wavelength of the broadband light source.

* * * * *